Dec. 9, 1958
A. J. DALPIAZ
2,863,203
CLAMP
Filed Nov. 18, 1955
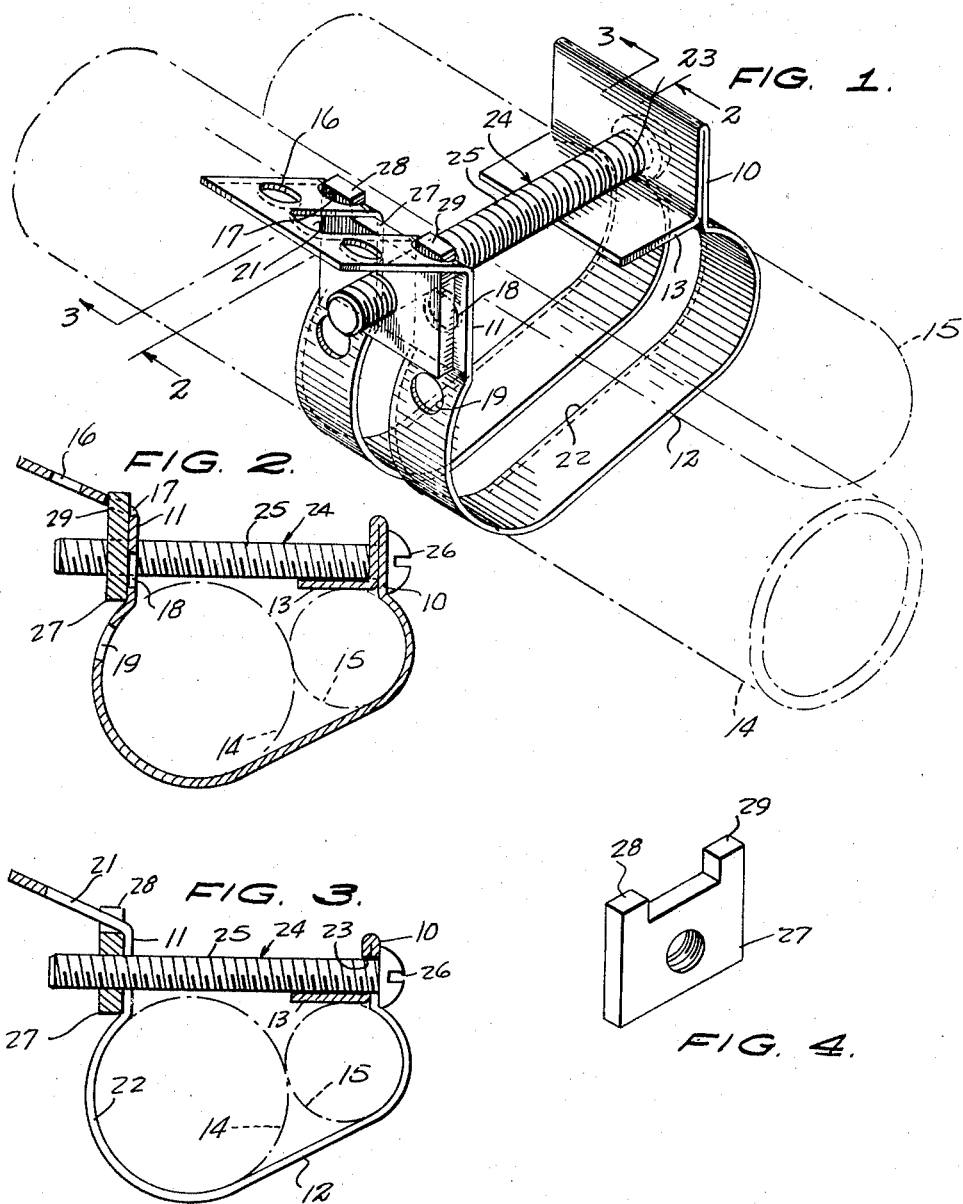
INVENTOR.
ALBERT J. DALPIAZ,
BY
McMorrow, Berman + Davidson
ATTORNEYS.

United States Patent Office 2,863,203
Patented Dec. 9, 1958

2,863,203

CLAMP

Albert J. Dalpiaz, Dennison, Ohio

Application November 18, 1955, Serial No. 547,697

1 Claim. (Cl. 24—279)

The present invention relates to a clamp for securing a pair of members in side by side relation and in particular to a clamp for securing a thermostat expansion valve bulb to a suction line in a refrigerator or in an air-conditioning unit.

An object of the present invention is to provide a clamp for securing a thermostat expansion valve bulb securely and dependably to the suction line of a refrigerator or an air-conditioning unit, and one which is adjustable so as to accommodate bulbs and suction lines of all sizes.

Another object of the present invention is to provide a clamp for securing a pair of members together, and one which has a fastening element easily and quickly assembled with a clamp surrounding one of the pair of members and before insertion of the other of the pair of members.

A further object of the present invention is to provide a lightweight clamp which is simple in structure, one sturdy in construction and of few parts, and one which is economically feasible and highly effective in action.

These and other objects and advantages of the present invention will be fully apparent from the following description when taken in connection with the annexed drawings, in which:

Figure 1 is an isometric view of the clamp of the present invention, the dotted line showing indicating a refrigerating suction line and a thermostat expansion valve bulb in place within the clamp, Figure 2 is a sectional view taken on the line 2—2 of Figure 1, Figure 3 is a sectional view taken on the line 3—3 of Figure 1, and Figure 4 is an isometric view of the nut portion of the clamp of the present invention.

Referring in greater detail to the drawing in which like numerals indicate like parts throughout the several views, the clamp of the present invention comprises a vertically-disposed rigid arm 10 and a resilient arm 11, also disposed vertically, arranged in spaced relation with respect to the rigid arm 10. A resilient strap 12 connects the lower end of the rigid arm 10 to the lower end of the resilient arm 11. The arms 10 and 11 and the strap 12 are formed integrally from a strip of bendable metal and the rigid arm 10 is bent back upon itself and has a rigid shelf 13 projecting inwardly of and fixedly secured to the lower end of the rigid arm 10.

The resilient strap 12 receivably engages a suction conduit 14 of a refrigerator or an air-conditioning unit and a thermostat expansion valve bulb 15 with the conduit 14 and the bulb 15 in side by side relation, the conduit and bulb being shown in dotted lines in Figures 1 to 3, inclusive. When the conduit 14 and the bulb 15 are engaged by the strap 12, the rigid shelf 13 rests upon the upper portion of the bulb 15 and a portion of the strap 12 adjacent the lower end of the resilient arm 11 rests upon the upper portion of the conduit 14.

A plurality of pairs of openings extend through the resilient arm 11, here shown as three pairs of openings indicated at 16, 17, and 18, and are arranged in spaced relation extending from the upper end of the resilient arm to the lower end of the latter, and another pair of openings 19 extend through the adjacent portion of the strap 12. The openings of each pair of openings 16 to 18, inclusive, are spaced from each other and extend transversely of the resilient arm 11, and the openings 19 extend transversely of the adjacent portion of the strap 12 and are also spaced from each other.

A slot 21 having a closed upper end extends from a point spaced inwardly of the upper end of the resilient arm 11 to the lower end of the arm 11 and connects with a slot 22 which extends longitudinally of the strap 12 and has its closed end in the outer portion of the rigid arm 10 and in registry with a hole 23 in the inner portion of the rigid arm 10.

A fastening element embodying a bolt 24 including a shank 25 having a head 26 on one end thereof is positioned so that the shank 25 rests upon the rigid shelf 13 and extends through the rigid arm 10 with the head 26 bearing against the exterior face of the rigid arm 10, the shelf 13 protecting the bulb 15 from the sharp threads of the bolt 24. The shank 25 of the bolt 24 is threaded throughout its length and extends slidably through the slot 21 in the resilient arm 11. A vertically-disposed nut 27 is positioned exteriorly of and bears against the exterior face of the resilient arm 11 and has its lower end bearing against the adjacent portion of the resilient strap 12. The nut 27 has internal threads and is threadedly secured to the shank 25 of the bolt 24.

Means is provided on the nut 27 for locking the nut 27 to the resilient arm 11. Specifically, this means embodies a pair of lugs 28 and 29 arranged in spaced relation and projecting perpendicularly from the upper end of the nut 27 and receivably engaged in the one pair 17 of the pairs of openings 16 to 19. The resilient arm 11 has the portion adjacent its upper end bent outwardly along a line extending transversely of the resilient arm 11 adjacent to and inwardly of the pair of openings 17 to form a second shelf sloping upwardly from the upper end of the remaining portion of the resilient arm 11.

The lower portion of the nut 27 bears against the adjacent portion of the resilient strap 12 and holds the nut 27 in its position with the lugs 28 and 29 through the pair of openings 17.

In use, the clamp of the present invention may be installed upon the suction conduit of a refrigerator or air-conditioning unit, by two methods. In the first method, the clamp is first placed with the strap around the suction conduit 14 and the bulb 15, the conduit 14 and the bulb 15 being arranged in side by side relation, and the bolt 24 is inserted through the hole 23 and the adjacent portion of the slot 22 in the rigid arm 10 and through the slot 21 in the resilient arm 11. The strap 12 is then drawn up to a position in which one of the pairs of openings 16 to 19, inclusive, is adjacent to and spaced above the upper ends of the lugs 28 and 29. The lugs 28 and 29 are next inserted in the selected ones of the openings 16 to 19, inclusive, and the bolt 24 is then turned into the nut 27 to tighten the strap around the conduit 14 and the bulb 15. The upper end of the resilient arm 11 is then bent outwardly to its upwardly-sloping position so that the selected one of the pairs of openings 16 to 19, inclusive, lock the nut 27 against the exterior face of the resilient arm 11.

The other method of assembling the clamp of the present invention upon the conduit 14 and the bulb 15 consists in wrapping the strap 12 around the conduit 14 and inserting the bolt 24 through the hole 23 in the adjacent portion of the slot 22 in the rigid arm 10 and then thread the nut 27 on the bolt 24. The strap 12 is then pulled over the nut 27 with the lugs 28 and 29 in a selected pair of holes 16 to 19, inclusive, depending upon the diameter of the conduit 14 and the diameter of the bulb 15, and the bulb 15 is next inserted into the remaining portion of the strap 12. The bolt 24 is next turned into the nut 27 to tighten the strap 12 around the conduit 14 and the bulb 15, each of which constitutes one of a pair of members. The upper end of the resilient arm 11 is then bent along a line transversely of the arm 11 adjacent to and inwardly of one of the pairs of openings 16 to 19, inclusive, so that the upper portion of the arm 11 forms an outwardly and upwardly-sloping shelf and a selected one of the pairs of openings receivably engage the lugs 28 and 29 of the nut 27 to hold the nut against the exterior face of the resilient arm 11 with its lower end bearing against the adjacent portion of the strap 12.

What is claimed is:

A clamp for affixing a pair of members in side by side relation comprising a vertically-disposed rigid arm, a vertically-disposed resilient arm arranged in spaced relation with respect to said rigid arm, a resilient strap connecting the lower ends of said arms together, a shelf projecting inwardly of said rigid arm and fixedly secured to the lower end of the latter, said strap being adapted to embracingly engage a pair of members arranged in side by side relation with said rigid shelf resting upon one of said members and with the portion of said strap adjacent the resilient arm resting upon the other of said members, said resilient arm having a plurality of pairs of openings extending in spaced relation from the upper end thereof to a point adjacent the lower end thereof, the openings of each of said pairs of openings being spaced from each other and positioned transversely of said resilient arm, there being a slot having a closed end and an open end extending longitudinally of said resilient arm with the closed end positioned inwardly of the upper end of said resilient arm and another slot having a closed end and an open end extending longitudinally of said strap with the closed end adjacent said rigid arm, the open ends of said slots being connected together, a fastening element including a threaded shank and a head on one end thereof positioned so that the shank rests upon said rigid shelf and extends through said rigid arm with the head bearing against the exterior face of said rigid arm, the portion of the shank adjacent the other end extending slidably through the slot in said resilient arm, a vertically-disposed nut positioned exteriorly of and bearing against the exterior face of said resilient arm and having its lower end bearing against the adjacent portion of said strap, said nut being threadedly secured to said shank portion, a pair of lugs arranged in spaced relation projecting perpendicularly from the upper end of said nut, said resilient arm having a portion adjacent its upper end bent outwardly along a line extending transversely of said resilient arm adjacent to and inwardly of a selected one pair of said pairs of openings to form a second shelf with said lugs receivably engaged in said one pair of openings for locking said nut to said resilient arm.

References Cited in the file of this patent

UNITED STATES PATENTS

| 1,584,498 | Vitek | May 11, 1926 |
| 2,650,404 | Dalpiaz | Sept. 1, 1953 |

FOREIGN PATENTS

| 705,247 | Great Britain | Mar. 10, 1954 |